United States Patent [19]

Charland et al.

[11] Patent Number: 5,452,551

[45] Date of Patent: Sep. 26, 1995

[54] TIERED FIRESTOP ASSEMBLY

[75] Inventors: Paul J. Charland, New Richmond, Wis.; Anthony J. Schommer, Cottage Grove, Minn.

[73] Assignee: Minnesota Mining and Manufacturing Company, Saint Paul, Minn.

[21] Appl. No.: 177,598

[22] Filed: Jan. 5, 1994

[51] Int. Cl.⁶ .............................. F16L 5/04; F16K 17/38; E04C 2/52
[52] U.S. Cl. .................. 52/232; 52/1; 52/220.8
[58] Field of Search .................. 52/232, 1, 317, 52/220.8, 741.3, 745.05, DIG. 5; 137/360, 362

[56] References Cited

U.S. PATENT DOCUMENTS

| | | |
|---|---|---|
| 4,061,344 | 12/1977 | Bradley et al. . |
| 4,109,423 | 8/1978 | Perrain . |
| 4,221,092 | 9/1980 | Johnson . |
| 4,245,445 | 1/1981 | Heinen .................................. 52/220.8 |
| 4,363,199 | 12/1982 | Kucheria et al. . |
| 4,364,210 | 12/1982 | Fleming et al. . |
| 4,467,577 | 8/1984 | Licht . |
| 4,538,389 | 9/1985 | Heinen . |
| 4,951,442 | 8/1990 | Harbeke, Jr. . |
| 4,952,615 | 8/1990 | Welna . |
| 5,058,341 | 10/1991 | Harbeke, Jr. . |
| 5,103,609 | 4/1992 | Thoreson et al. . |
| 5,105,592 | 4/1992 | MacMillian .............................. 52/232 |
| 5,129,201 | 7/1992 | Robertson et al. . |
| 5,155,957 | 10/1992 | Robertson et al. . |
| 5,317,845 | 6/1994 | Bodycomb ............................ 52/58 X |
| 5,347,767 | 9/1994 | Roth .................................. 52/220.8 X |
| 5,351,448 | 10/1994 | Gohlke et al. ..................... 52/220.8 X |

OTHER PUBLICATIONS

ASTM Standard Method of Fire Tests of Through–Penetration Fire Stops (Designation E814–83).
ASTM Standard Test Methods for Fire Tests of Building Construction and Materials (Designation E119–88).
3M Fire Barrier RC–1 Restricting Collar brochure (96–0701–2682–0(202.2)R) by 3M Fire Protection Products.

Primary Examiner—Carl D. Friedman
Assistant Examiner—Robert J. Canfield
Attorney, Agent, or Firm—Gary L. Griswold; Walter N. Kirn; James J. Trussell

[57] ABSTRACT

The invention relates to a firestop assembly for a pipe, comprising first and second intumescent firestop rings. The first intumescent firestop ring overlies the pipe, and extends along the pipe for a first distance, and the second intumescent firestop ring overlies the first intumescent firestop ring and extends along the pipe for a second distance. The first distance is not equal to the second distance, and the firestop assembly so provided is particularly adapted for firestopping a plastic pipe.

24 Claims, 4 Drawing Sheets

TIERED FIRESTOP ASSEMBLY

TECHNICAL FIELD

The present invention relates to a firestop assembly used to surround a pipe.

BACKGROUND OF THE INVENTION

Firestop assemblies are often used to prevent fire and smoke from spreading from one room of a building to an adjacent room. Fire and smoke often spread from room to room through openings between a pipe and a wall through which the pipe passes, and a firestop assembly may be used at the pipe/wall junction to prevent the spread of fire and smoke between rooms. In similar fashion, a firestop assembly may be used at the junction between a pipe and the ceiling of a room, to prevent the spread of fire and smoke from one room to the room above it.

FIG. 1 illustrates a partial cut-away view of a building 10, including a "fire" room 12, and adjacent rooms 14, 16, 18, and 20. A pipe 22 passes through rooms 12, 14, 16, 18, and 20, and a firestop assembly is placed at each of locations A, B, C, D, E, F, and G. If pipe 22 is plastic, no firestop is typically placed at location H, because the heat and smoke from a fire in room 20 rises to the ceiling in that room, rather than dropping to the floor, and thus the firestop assembly at the ceiling of the room below is sufficient.

A fire 30 is blazing in room 12, and the firestop assemblies at B, C, and E operate to prevent the spread of fire from room 12 through the openings between the pipe and the walls, and into rooms 14, 16, and 20, respectively. By containing the smoke and flames within room 12, the danger to persons and property can be minimized because fire fighters must fight a smaller, controlled fire rather than a larger, spreading fire. Thus, firestop assemblies are of considerable benefit in protecting persons, property, and edifices from fire and smoke damage.

A typical firestop assembly 50 is shown in FIG. 2, and comprises intumescent wrap strip 56 and band clamp apparatus 58. Firestop assembly 50 is fitted around the periphery of pipe 52, and abuts wall 54. One or more layers of an intumescent wrap strip 56 (two, in the illustrated assembly) are wrapped around the periphery of pipe 52, and are secured to pipe 52 by band clamp apparatus 58. Wall mount apparatus 60 is also provided, to anchor the firestop assembly to wall 54.

Intumescent wrap strips useful in such firestop assemblies typically comprise polymeric binders, fillers, and intumescent particles. Useful intumescent particles include silicates, expanding graphite, and vermiculite. Typically, such a mixture is compounded with sufficient additives to make a sheet that has suitable expansion, flexibility, and handling characteristics. When subjected to heat or flames, the sheet material expands to seal an opening and forms a strong, insulating char that acts as a barrier to heat, smoke, and flames. A preferred intumescent wrap strip is available under the designation "FS-195" or "FS-195+" intumescent sheet from the Minnesota Mining and Manufacturing Company of St. Paul, Minn. Preferably, the intumescent sheet material is laminated to a restraining layer, such as a metal (preferably aluminum) foil, which acts to control the direction of the expansion of the intumescent sheet. Other materials useful as restraining layers are described in commonly assigned U.S. Pat. No. 4,467,577 (Licht), and include metal screen, paper, cardboard, and rubber or plastic sheets.

The expansion ratio of the intumescent wrap strip (the volume of the wrap strip after exposure to heat, divided by the volume of the wrap strip before exposure to heat, or $V_{after}/V_{before}$) is large (e.g. at least 8.0), and thus the wrap strip tends to expand around the pipe when heat from a fire reaches the wrap strip. Because the expansion of the wrap strip is circumferentially contained (by the restraining layers, or by the band clamp apparatus 58) the intumescent wrap strip expands radially inward—toward the pipe—and firestops, or chokes off, the flow of air and smoke through gap 66 between the firestop assembly and the pipe. During a fire, the intumescent material becomes a rigid char that seals against the passage of smoke, vapors, and water.

Although metal and glass pipe is commonly used for many commercial applications, the use of plastic pipe is increasingly widespread because plastic pipe is inexpensive, tough, nonreactive with most chemicals, and easy to install. For example, pipes made of polypropylene (PP), polyvinyl chloride (PVC), acrylonitrile-butadiene-styrene (ABS), chlorinated polyvinyl chloride (CPVC), and the like may be used as waste pipes in laboratory or factory facilities. However, conventional firestop assemblies are not well adapted to firestop plastic pipes—particular those of large diameter (e.g. 15.2 cm (6 in) or greater)—because plastic pipes tend to collapse when subjected to high temperatures. When a plastic pipe collapses, a sizable gap can be formed between the pipe and the firestop assembly, and conventional firestop assemblies are typically unable to reliably accommodate this reduction in pipe size, which may in turn allow smoke and flames to spread to adjacent rooms. This disadvantage of conventional firestop assemblies can be dangerous to life and to property, and it is therefore desirable to provide a firestop assembly that can reliably firestop both conventional metal and glass pipes, as well as plastic pipes.

SUMMARY OF THE INVENTION

The present invention provides a firestop assembly for surrounding a pipe, comprising a first intumescent firestop ring encircling the pipe and extending for a first distance along the longitudinal axis of the pipe, a second intumescent firestop ring overlying the first intumescent firestop ring and encircling the pipe, the second firestop ring extending for a second distance along the longitudinal axis of the pipe, wherein the second distance is not equal to the first distance, and means for securing the first and second intumescent firestop rings to the pipe.

In another aspect of the present invention, a method is provided for applying a firestop assembly to a pipe having a longitudinal axis and an outer peripheral surface. The method comprises the steps of wrapping the outer peripheral surface of the pipe with a first intumescent firestop ring extending for a first distance along the longitudinal axis of the pipe, wrapping a second intumescent firestop ring over the first intumescent firestop ring and around the pipe, the second firestop ring extending for a second distance along the longitudinal axis of the pipe, wherein the second distance is not equal to the first distance, and securing the first and second intumescent firestop rings to the pipe.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

The present invention provides a firestop assembly having at least two intumescent firestop rings, each comprising one or more layers of an intumescent wrap strip, and a restraining collar. Each layer may comprise one or more discrete pieces of wrap strip. The rings overlie each other, and extend for different distances along the length of the pipe. Thus, the rings provide a tiered or "telescopic" effect, which is beneficial in firestopping plastic pipes of large diameter. The firestop assembly of the present invention is believed to have particular utility when applied to plastic pipes. Plastic pipes, as noted previously, tend to collapse when subjected to elevated temperatures. The firestop assemblies of the present invention, by providing tiered rings of intumescent wrap strip, rapidly expands to close the area between the collapsing pipe and the wrap strip. This rapid expansion is thought to result from more effective heat transfer from the high temperature environment to the tiered rings of intumescent wrap strip, in contrast to the stacked intumescent wrap strips of conventional firestop assemblies. Thus, the tiered arrangement is believed to provide certain performance advantages not provided by conventional firestop assemblies.

Figure 3:
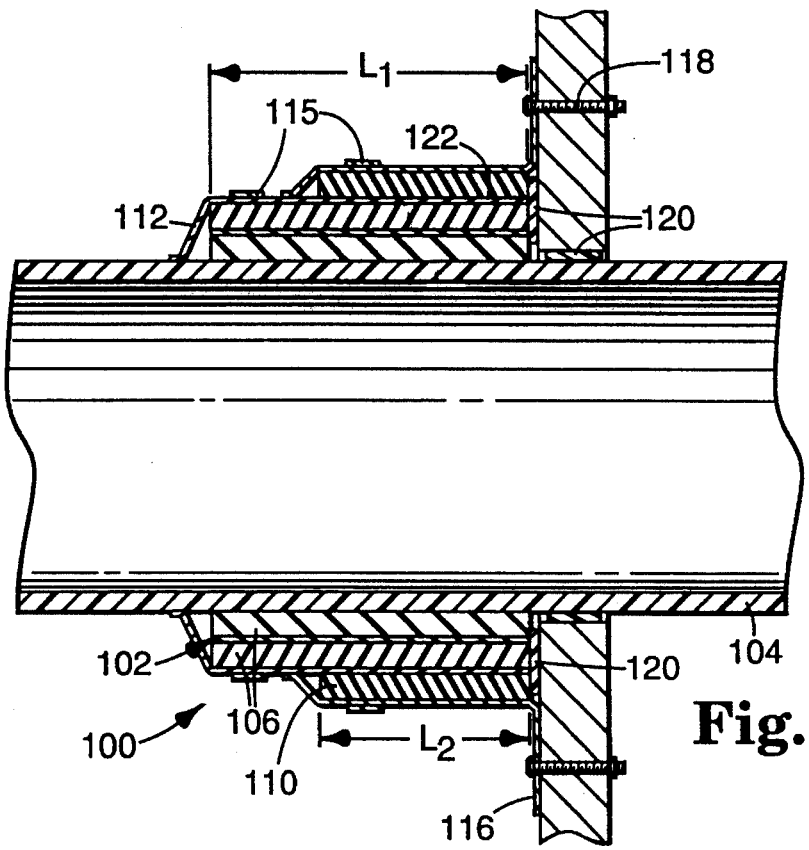
FIG. 3 is a sectional view of a firestop assembly according to the present invention.

FIG. 3 illustrates a firestop assembly 100 according a first embodiment of the present invention. The firestop assemblies of the present invention are shown as being affixed to a wall, although for the sake of simplicity a matching firestop assembly is not illustrated on the opposite side of those walls. Firestop assembly 100 includes a first intumescent firestop ring 102 that encircles a pipe 104, and extends for a first distance $L_1$ along the longitudinal axis of the pipe. Distance $L_1$ may be any suitable distance, and is typically from between about 5.1 cm (2.0 in) to about 15.2 cm (6.0 in).

First intumescent firestop ring 102 comprises one or more layers of intumescent wrap strip 106. The intumescent wrap strip may be of the type available from the Minnesota Mining and Manufacturing Company of St. Paul, Minn. under the designations FS-195 or FS-195+, both of which comprise an intumescent wrap strip laminated to a layer of aluminum foil. The intumescent wrap strip expands in response to the application of heat, to provide an insulating, fire retardant barrier surrounding pipe 104. For example, the intumescent wrap strip may intumesce at temperatures greater than 110° C. (230° F.).

The first intumescent firestop ring 102 may be fastened to pipe 104 by any appropriate means. For example, a band clamp apparatus 115 may encircle first ring 102, to compress first ring 102 against pipe 104. Other fastening means are also contemplated, including but not limited to worm gear clamps (hose clamps), screws, spring loaded clamps, clips, locking tabs, and adhesive tape. Alternatively, second intumescent firestop ring 110, which overlies first ring 102 as described below, may be used to secure first ring 102 against pipe 104. Other first ring fastening means may be provided, as known in the art.

Figure 4:
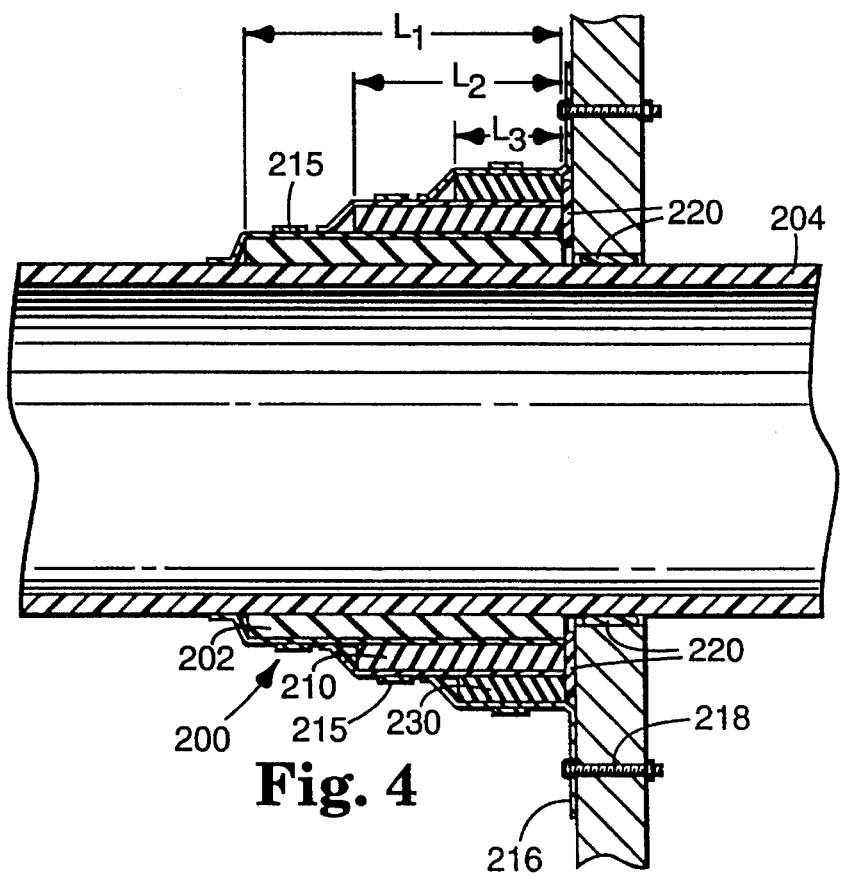
FIG. 4 is a sectional view of a second embodiment of a firestop assembly according to the present invention.

Second intumescent firestop ring 110 overlies first intumescent firestop ring 102 and encircles pipe 104. Second ring 110 extends for a second distance $L_2$ along the longitudinal axis of the pipe, wherein $L_2$ is not equal to $L_1$. In the illustrated embodiment, $L_2$ is less than $L_1$, although embodiments wherein $L_2$ is greater than $L_1$ (as shown in FIG. 4) are also contemplated. Second ring 110 typically is constructed with wrap strip made of the same material as first ring 102, which is described in detail above. Similarly, second ring 110 may be fastened to pipe 104 in the same manner contemplated with respect to first ring 102, including but not limited to the use of a band clamp apparatus 115 or other similar structure.

A restraining collar 112 may also be provided, which collar may be integral with the means for securing the various rings to the pipe. The restraining collar circumferentially contains the various firestop rings, such that the intumescent wrap strip expands radially inward—toward the pipe—and firestops the pipe. As shown in FIG. 3, restraining collar 112 may comprise sheet metal, such as 28 gauge stainless steel. The shape of restraining collar 112 preferably matches the profile of the firestop rings that it overlays, to provide both circumferential containment and an aesthetically acceptable surface. Also provided are clamps 115, which secure restraining collar 112 over the firestop rings.

Means are provided for mounting the firestop assembly of the present invention to a wall, ceiling, or floor. In the illustrated embodiments, the mounting means is shown as a plurality of radially extending mounting tabs 116, which may be nailed, screwed, or bolted into the wall, for example. The mounting means, in whatever form provided, typically must have at least a 34 kg (75 lb) pull-out strength, to prevent the firestop assembly from separating from the wall during a fire. The mounting tabs, which are described in greater detail in commonly assigned U.S. Pat. No. 5,103,609 (Thoreson et al.), and U.S. Pat. No. 5,058,341 (Harbecke), the contents of both of which are incorporated herein by reference, may be unitary with the restraining collar 112, or may be separate. The mounting tabs may include holes through which fasteners 118 pass to fasten the firestop assembly 100 to a wall. The interface between the pipe, the firestop assembly, and the wall or ceiling may also be sealed with a bead of intumescent caulk 120, if desired.

As shown in FIG. 3, heat transfer means may also be provided between adjacent intumescent firestop rings. In the embodiment illustrated in FIG. 3, heat transfer means is shown as a layer of sheet metal 122, which may be aluminum foil, interposed between first intumescent firestop ring 102 and second intumescent firestop ring 110. Sheet metal layer 122 transfers heat from the elevated temperature environment to both the first and second intumescent firestop rings, which facilitates expansion of the intumescent wrap strips. The size and shape of the sheet metal layer 122 may be selected as desired, but is believed that the thickness of the sheet metal layer should be in the range of 0.05 cm (0.0187 in - 28 gauge) to 0.07 cm (0.0276 in - 24 gauge) to both minimize weight and maximize heat transfer. The sheet metal layer 122 may extend along all or only a part of any of the intumescent firestop rings, as desired. Other heat transfer means are also contemplated, including but not limited to spaced metal rods and other heat conductive sheets, tabs, rods, or tubes.

Embodiments other than that described above are also contemplated. For example, FIG. 4 illustrates a second embodiment of the present invention, which is similar in structure to the embodiment shown in FIG. 3. Firestop assembly 200 includes first firestop ring 202, second firestop ring 210, and a third intumescent firestop ring 230. Although in the illustrated embodiment third ring 230 has a length $L_3$ that is less than either of $L_2$ or $L_1$, $L_3$ could have any suitable length, and thus could be less than, equal to, or greater than either of $L_2$ or $L_1$. As with the embodiment previously described, third ring 230 may comprise one or more layers of an intumescent wrap strip, and may be fastened around pipe 204 by any suitable means. Other aspects of the firestop assembly 200 are generally similar to those described with reference to FIG. 3.

The size and number of layers of wrap strip that are required in each of the embodiments described herein depends on the type and diameter of pipe on which the assembly is used. For example, for a 15.2 cm (6.0 in) inner diameter fire resistant polypropylene (FRPP) pipe, the first ring may have a length $L_1$ of approximately 15.2 cm (6.0 in) and a thickness of 1.27 cm (0.5 in), the second ring may have a length $L_2$ of approximately 10.16 cm (4.0 in) and a thickness of 0.635 cm (0.25 in), and the third ring may have a length $L_3$ of approximately 5.08 cm (2.0 in) and a thickness of 0.635 cm (0.25 in). The various rings may be secured to the pipe during installation by a 5.1 cm (2 in) long piece of an adhesive tape. Any suitable adhesive tape may be used, and a preferred tape is an aluminum foil tape of the type available from the Minnesota Mining and Manufacturing Company of St. Paul, Minn., under the designation T49 aluminum tape.

Figure 5:
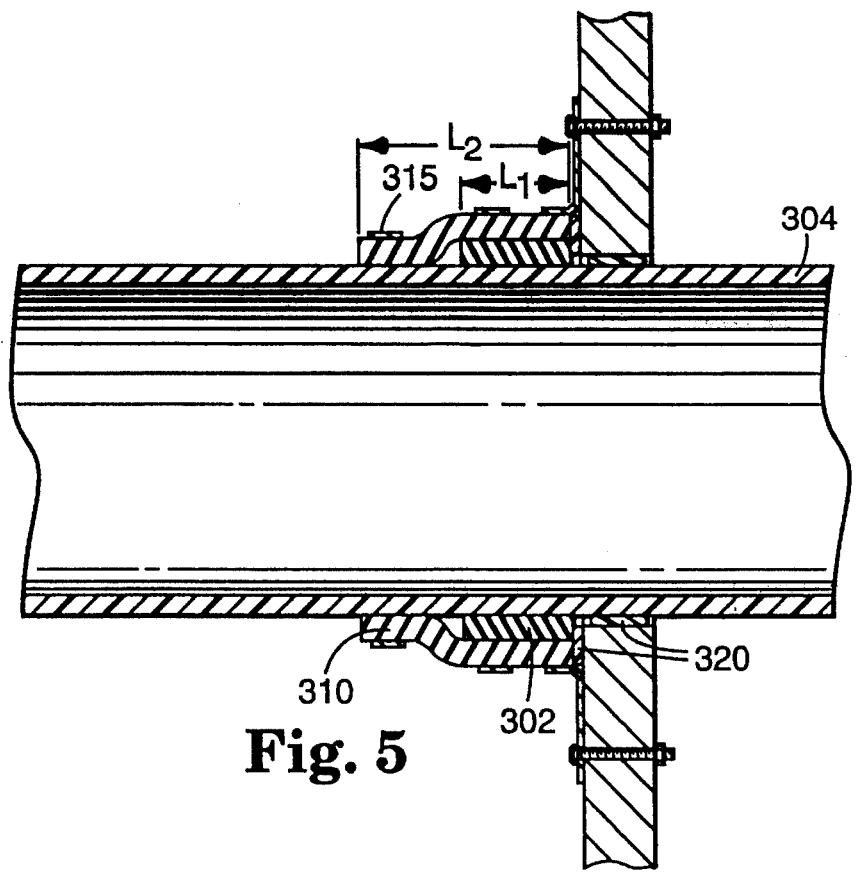
FIG. 5 is a sectional view of a third embodiment of a firestop assembly according to the present invention.

FIG. 5 illustrates another embodiment of the present invention having two intumescent firestop rings 302 and 310, wherein $L_2$ is greater than $L_1$. That is, second intumescent firestop ring 310 overlies first intumescent firestop ring 302, and extends along the longitudinal axis of pipe 304 for a greater distance than does first ring 302. As with the other embodiments described herein, each firestop ring may have one or more layers of intumescent wrap strip, as desired, and may be fastened around pipe 304 by any suitable means. Note that separate heat transfer means (e.g. sheet metal) are not illustrated in FIG. 5 or in FIG. 6.

Figure 6:
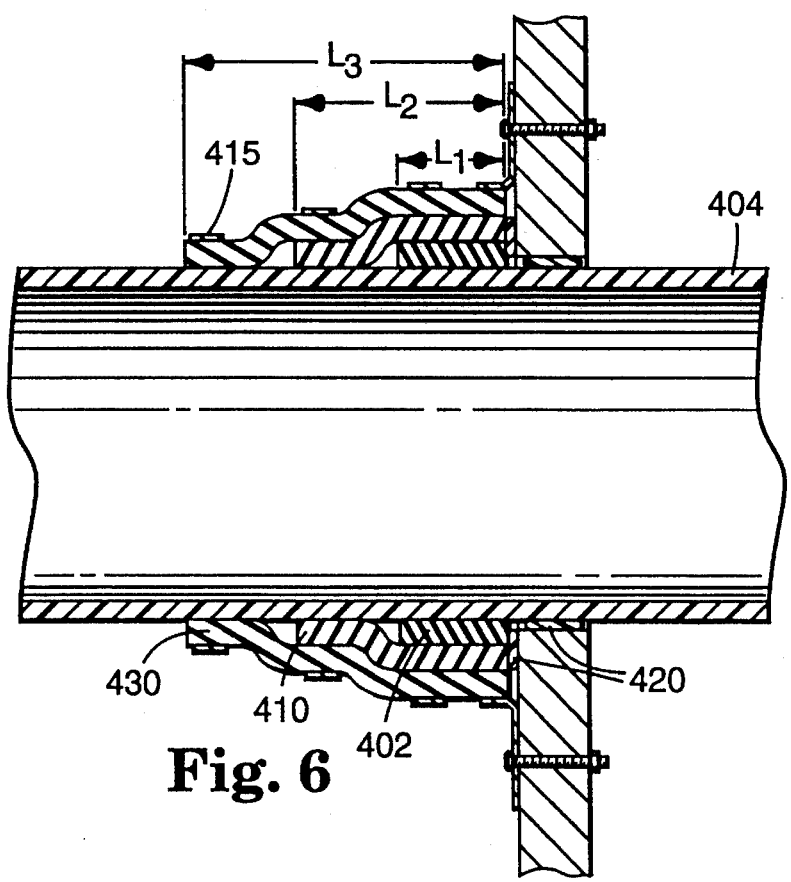
FIG. 6 is a sectional view of a fourth embodiment of a firestop assembly according to the present invention.

FIG. 6 is yet another embodiment of the present invention, which is similar in structure to the embodiment shown in FIG. 5. In FIG. 6, a third intumescent firestop ring 430 is provided, and overlays second intumescent firestop ring 410. Although in the illustrated embodiment third ring 430 has a length $L_3$ that is greater than either of $L_2$ or $L_1$, $L_3$ could in fact have any suitable length, and thus could be less than, equal to, or greater than either of $L_2$ or $L_1$. As with the embodiment previously described, third ring 430 may comprise one or more layers of an intumescent wrap strip, and may be fastened around pipe 404 by any suitable means.

Figure 7:
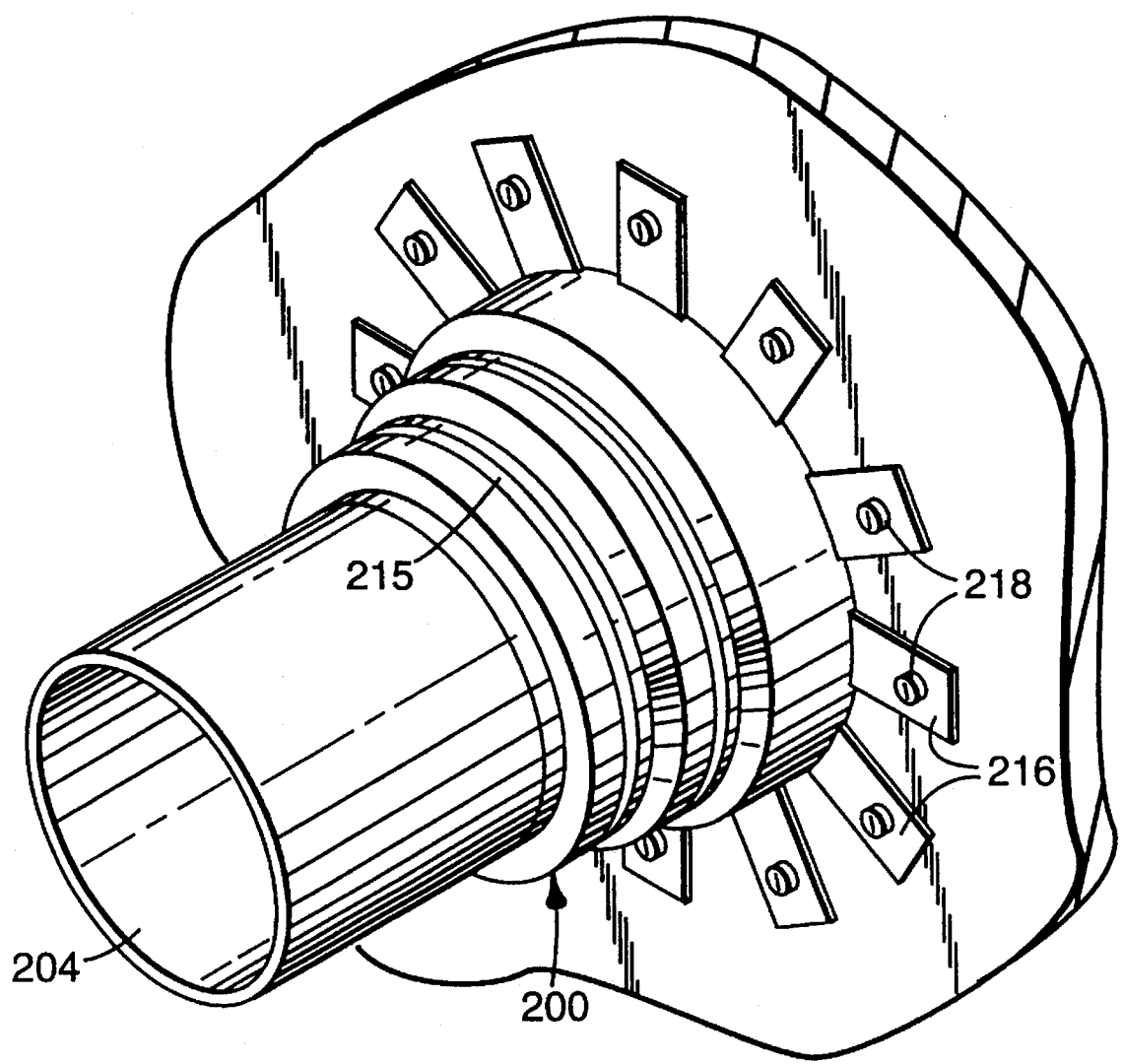
FIG. 7 is a perspective view of a firestop assembly according to the present invention.

The tiered, or telescopic effect of the firestop assembly 100 of the present invention is also illustrated in perspective view in FIG. 7. In that embodiment, the first ring 102 extends for the greatest distance along pipe 104, the second ring 110 extends for a lesser distance along pipe 104, and the third ring 130 extends for still a lesser distance along pipe 104.

The advantages of the present invention will be described in the context of the following Examples, in which the Comparative Example represents a conventional firestop assembly, and Examples One and Two represent various embodiments of the present invention. For clarity, all pipe measurements provided herein are inner diameter measurements.

EXAMPLES

A conventional firestop assembly and two embodiments of the present invention were tested under the following conditions. Each firestop assembly was fastened to a fire resistant polypropylene (FRPP) pipe in the manner described below with reference to each respective embodiment. The intumescent wrap strip was of the type available from the Minnesota Mining and Manufacturing Company of St. Paul, Minn., under the designation FS-195 F/R. A restricting collar was used to surround the rings of wrap strip, and were of the type available from the Minnesota Mining and Manufacturing Company of St. Paul, Minn., under the designation RC-1. A worm gear clamp, also known as a hose clamp, measuring 1.25 cm (0.5 in) wide by 0.07 cm (0.028 in) thick was used to fasten the restricting collar over the intumescent wrap sheets. A 0.63 cm (0.25 in) bead of intumescent fire barrier caulk of the type available from the Minnesota Mining and Manufacturing Company of St. Paul, Minn., under the designation CP 25WB+ was placed at the interface of the firestop assembly and the concrete slab. The caulk is a smoke seal, and may also act as a fire seal under suitable conditions.

A 15.2 cm (6 inch) length of 2.5 cm (1 inch) thick fiberglass insulation (having a foil-scrim-kraft facing, commercially available from Owens-Corning Fiberglass Corporation of Granville, Ohio) was installed around the pipe beneath the bottommost restricting collar. The pipe was positioned in an opening having a diameter of 17.8 cm (7 in) in a poured concrete slab measuring approximately 11.4 cm (4.5 in) thick and 91.4 cm (3 ft) square. The concrete slab simulated a floor for purposes of the Examples. The firestop assembly was fastened to the concrete slab by steel masonry fasteners measuring 3.8 cm (1.5 in) long by 0.63 cm (0.25 in) in diameter inserted through holes in the mounting tabs. The pipe was sealed on the exposed, or hot side of the assembly by means of a polyvinyl chloride (PVC) cap.

The pipe was 133.0 cm (52.5 in) long, and when installed projected approximately 30.5 cm (12 inches) below the exposed surface of the concrete slab, and 91 cm (36 inches) above the unexposed surface of the concrete slab. The combination of pipe, slab, and firestop assembly was positioned on top of a gas fired furnace, commercially available as a kiln from Armil C.F.S. of South Holland, Ill., with the firestop assembly on the hot side of the concrete slab.

The test consisted of two parts. The first part, known as the fire exposure portion of the test, tested the resistance of the firestop assembly to a fire. The time and temperature parameters outlined in Figure One of ASTM (American Society for Testing and Materials) E119-83, the contents of which are incorporated herein by reference, were followed for the test. A firestop assembly successfully completed the fire exposure test if it withstood the applied heat for a period of at least one hour. If a firestop assembly allowed flames to pass through the pipe from the hot side of the slab to the cold side of the slab, that firestop assembly was said to have failed the fire exposure portion of the test.

The second part of the test of each firestop assembly was conducted immediately following the conclusion of the fire exposure part of the test. The hose stream portion of the test tested the resistance of the firestop to a stream of water propelled against the firestop at a pressure of 0.21 MPa (30 lbs/in$^2$). The intumescent material of the firestop assembly must have withstood (i.e. continued to seal the pipe) the water stream for a period of 1.5 seconds per square foot of test structure (e.g. 13.5 seconds for a 3 foot by 3 foot concrete slab). This test is further described in ASTM E119-83, the contents of which were previously incorporated by reference.

Comparative Example

Figure 1:
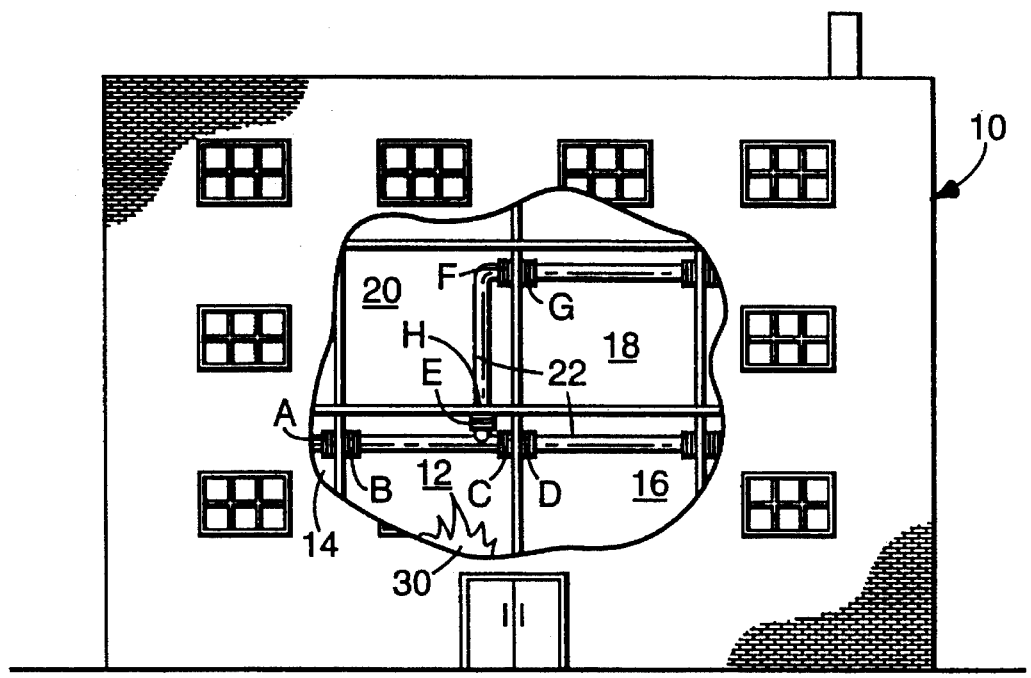
FIG. 1 is a partial cut-away view of a building having a plurality of rooms, and a pipe passing between several of the rooms.
Figure 2:
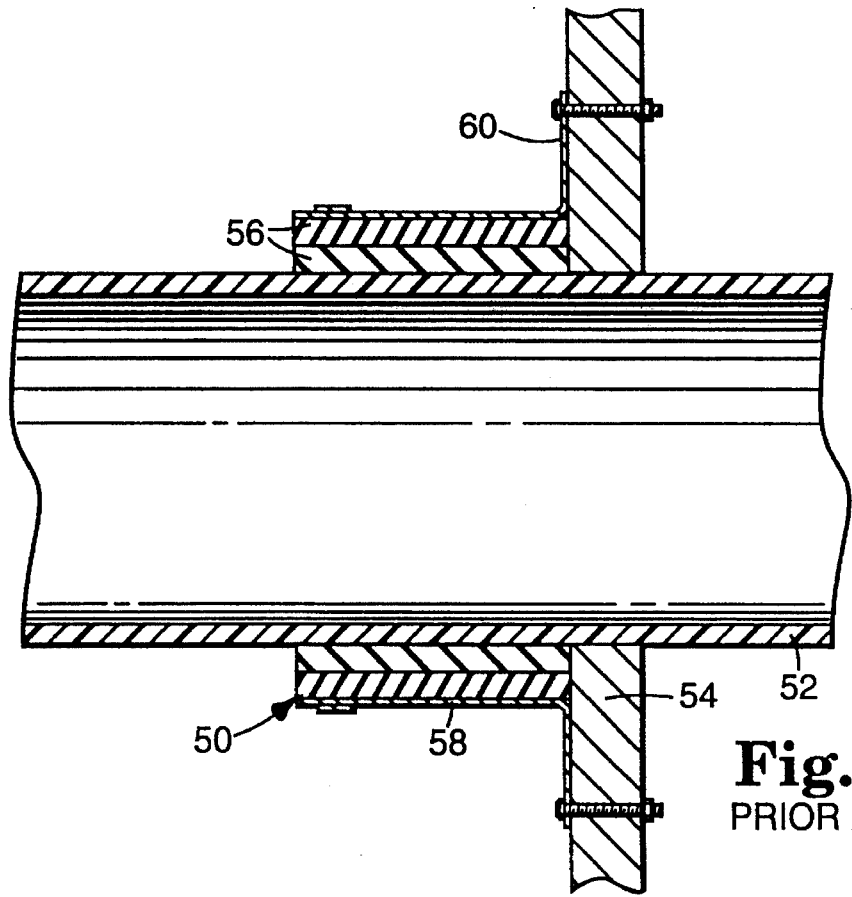
FIG. 2 is a sectional view of a conventional firestop assembly.

A conventional firestop assembly was prepared, generally resembling the assembly illustrated in FIG. 2. A 15.2 cm (6.0 in) diameter fire resistant polypropylene pipe (FRPP) was wrapped with a single ring of wrap strip. The single ring comprised four layers of wrap strip, and each layer included two adjacent pieces of wrap strip measuring 5.1 cm (2.0 in) wide. A sufficient length of wrap strip was wrapped around the pipe to enable the ends of each wrap strip to overlap by approximately 0.5 cm (0.375 in). The first ring was applied to the pipe and held in place by means of aluminum tape of the type available from the Minnesota Mining and Manufacturing Company under the designation T49. An RC-1 restricting collar was provided with mounting tabs along one edge and support tabs on the other, and was cut to fit around the ring of wrap strips. The restricting collar was held in place around the first ring by a worm gear clamp. The support tabs were bent inward to hold the wrap strips in place at the lower edge of the first ring.

The firestop assembly was subjected to a 120 minute fire exposure test with the furnace temperatures controlled in accordance with ASTM E814-83 standard, which is equivalent to the ANSI/UL (American National Standards Institute/ Underwriters Laboratory) 1479 standard. During the initial 2 minutes of fire exposure, the furnace pressure with respect to atmospheric pressure was slightly negative to neutral. Thereafter, the furnace pressure was positive.

In the first test, the firestop performed satisfactorily, in that no flame passed through the pipe or the firestop assembly. Immediately following the fire exposure test, the exposed surface of the firestop assembly was subjected to a 0.21 MPa (30 lb/in$^2$) water hose stream test conducted in accordance with the ANSI/UL 1479 standard, the contents of which are incorporated by reference herein. The firestop assembly was dislodged from the opening by the force of the water hose stream, allowing a projection of water beyond the unexposed surfaces. Thus, the firestop assembly failed the second test. This failure is believed to have occurred due to heat degradation of the intumescent wrap strip, and to an insufficient mass of wrap strip to maintain an adequate seal.

Example 1

This Example illustrates a three tiered firestop assembly, generally resembling the assembly illustrated in FIG. 7. A 15.2 cm (6.0 in) diameter fire resistant polypropylene pipe (FRPP) was used. First, a first ring of intumescent wrap strip was wrapped around the pipe. The first ring included two layers of wrap strip, and each layer included three adjacent portions measuring 5.1 cm (2.0 in) wide. A sufficient length was wrapped around the pipe to enable the ends of each layer to overlap by approximately 0.5 cm (0.375 in). The first ring was held in place by means of T49 aluminum tape. An RC-1 restricting collar was applied to the end of the first ring furthest from the concrete block, and a worm gear clamp was applied thereover and tightened. The mounting tabs at the top of the collar were cut off, except for two tabs that extended over a portion of the first ring.

The second ring was wrapped over the first ring, thereby covering the two tabs of the restricting collar applied over the first ring. The second ring was a single layer of wrap strip, including two adjacent pieces of wrap strip each measuring 5.1 cm (2.0 in) wide. A second RC-1 restricting collar was applied over the second ring, all mounting tabs except two were cut off, and those two mounting tabs extended over portions of the second ring. A worm gear clamp was applied thereover and tightened. A third ring, comprising a single layer of wrap strip measuring 5.1 cm (2.0 in) was wrapped over the second ring, and a third RC-1 restricting collar was secured around the third ring by a worm gear clamp. Support tabs provided on each of the restricting collars were bent inward (toward the pipe) to hold the respective rings in position. Every sixth support tab on the top and middle restricting collars was affixed to the collar below it by a sheet metal screw measuring approximately 1.2 cm (0.5 in) long.

The firestop assembly was subjected to a 180 minute fire exposure with the furnace temperatures controlled in accordance with ASTM E814-83 standard (equivalent to the ANSI/UL 1479 standard). No flame-through developed in the firestop assembly during the fire exposure test.

Immediately following the fire exposure test, the exposed surface of the firestop assembly was subjected to a 0.21 MPa (30 lb/in$^2$) water hose stream test conducted in accordance with the ASTM E814-83 (ANSI/UL 1479) standard. The firestop assembly passed the hose stream test.

The foregoing Examples indicate that the firestop assembly of the present invention exhibits acceptable performance under these test conditions.

The present invention has now been described with reference to several embodiments thereof. It will be apparent to those skilled in the art that many changes can be made in the embodiments described without departing from the scope of the invention. Thus, the scope of the present invention should not be limited to the structures described herein, but rather by the structures described by the language of the claims, and the equivalents of those structures.

We claim:

1. A firestop assembly for surrounding a pipe having a longitudinal axis, said firestop assembly comprising:
   a) a first intumescent firestop ring adapted to extend for a first distance along the longitudinal axis;
   b) a second intumescent firestop ring overlying said first intumescent firestop ring, said second firestop ring adapted to extend for a second distance along the longitudinal axis, wherein said second distance is not equal to said first distance;
   c) heat transfer means interposed between said first intumescent firestop ring and said second intumescent firestop ring; and
   d) means for securing said first and second intumescent firestop rings to a pipe.

2. The firestop assembly of claim 1, wherein said first distance is greater than said second distance.

3. The firestop assembly of claim 1, wherein said second distance is greater than said first distance.

4. The firestop assembly of claim 1, wherein said first and second intumescent firestop rings comprise intumescent particles and an organic binder.

5. The firestop assembly of claim 1, wherein said assembly further comprises:
   d) means for securing the firestop assembly to one of a wall or a floor or a ceiling through which the pipe passes.

6. The firestop assembly of claim 1 in combination with a pipe, wherein said first and second firestop rings encircle said pipe, and wherein said pipe is made from a material selected from the group consisting of polypropylene, polyvinyl chloride, acrylonitrile-butadiene-styrene, and chlorinated polyvinyl chloride.

7. The firestop assembly of claim 1, wherein said ring securing means comprises a band clamp apparatus fastened over said second intumescent firestop ring.

8. The firestop assembly of claim 1, wherein said first intumescent firestop ring comprises at least two discrete layers of an intumescent mat.

9. The firestop assembly of claim 1, wherein said second intumescent firestop ring comprises at least two discrete layers of an intumescent mat.

10. The firestop assembly of claim 1, wherein said heat transfer means comprises a layer of sheet metal encircling said first intumescent firestop ring.

11. A firestop assembly for surrounding a plastic pipe having a longitudinal axis, said firestop assembly comprising:
   a) a first intumescent firestop ring adapted to extend for a first distance along the longitudinal axis, said first intumescent firestop ring comprising at least one layer of an intumescent mat;
   b) a second intumescent firestop ring overlying said first intumescent firestop ring, said second intumescent firestop ring comprising at least one layer of an intumescent mat and adapted to extend for a second distance along the longitudinal axis, wherein said second distance is not equal to said first distance;
   c) heat transfer means interposed between said first intumescent firestop ring and said second intumescent firestop ring: and
   d) band clamp means for securing said first and second intumescent firestop rings to a pipe.

12. The firestop assembly of claim 11, wherein said first distance is greater than said second distance.

13. The firestop assembly of claim 11, wherein said second distance is greater than said first distance.

14. The firestop assembly of claim 11, wherein said intumescent mats comprise intumescent particles and an organic binder.

15. The firestop assembly of claim 11 in combination with a pipe, wherein said first and second firestop rings encircle said pipe, and wherein said pipe is made from a material selected from the group consisting of polypropylene, polyvinyl chloride, acrylonitrile-butadiene-styrene, and chlorinated polyvinyl chloride.

16. The firestop assembly of claim 11, wherein said heat transfer means comprises a layer of sheet metal encircling said first intumescent firestop ring.

17. A method of applying a firestop assembly to a pipe having a longitudinal axis and an outer peripheral surface, comprising:
   a) wrapping the outer peripheral surface of the pipe with a first intumescent firestop ring extending for a first distance along the longitudinal axis of the pipe;
   b) wrapping a second intumescent firestop ring over the first intumescent firestop ring and around the pipe, the second firestop ring extending for a second distance along the longitudinal axis of the pipe, wherein the second distance is not equal to the first distance;
   c) providing heat transfer means interposed between the first intumescent firestop ring and the second intumescent firestop ring; and
   d) securing the first and second intumescent firestop rings to the pipe.

18. The method of claim 17, wherein the first distance is greater than the second distance.

19. The firestop assembly of claim 17, wherein the second distance is greater than the first distance.

20. The method of claim 17, wherein the first and second intumescent firestop rings comprise intumescent particles and an organic binder.

21. The method of claim 17, wherein the method further comprises the step of:
   d) securing the firestop assembly to one of a wall or a floor or a ceiling through which the pipe passes.

22. The method of claim 17, wherein the pipe is made from a material selected from the group consisting of polypropylene, polyvinyl chloride, acrylonitrile-butadiene-styrene, and chlorinated polyvinyl chloride.

23. The method of claim 17, wherein the first intumescent firestop ring comprises at least two discrete layers of an intumescent mat.

24. The method of claim 17, wherein the second intumescent firestop ring comprises at least two discrete layers of an intumescent mat.

\* \* \* \* \*